United States Patent Office 3,685,967
Patented Aug. 22, 1972

3,685,967
PROCESS AND APPARATUS FOR CONCENTRATING ISOTOPES BY THE SIMULTANEOUS EXCHANGE OF HEAT AND MASS
Victor R. Thayer, R.D. 3, Newark, Del. 19711
Filed Aug. 4, 1969, Ser. No. 847,307
Int. Cl. B01d 59/32; C01b 5/02; C07c 141/00
U.S. Cl. 423—580
9 Claims

ABSTRACT OF THE DISCLOSURE

The method and apparatus disclosed relates to the production of a concentrate of an isotope of an element by chemically exchanging at different temperatures isotopes of the same element between chemically different fluids which are physically separable from each other and which are capable of containing each of the isotopes. According to the method, both heat and isotopes are exchanged between the fluids simultaneously while the fluids are flowing countercurrently with respect to each other within a temperature gradient. Conduits positioned within an exchange tower recirculate one or both of the fluids to permit simultaneous direct and indirect heat exchange as well as isotope exchange between the fluids.

BACKGROUND OF THE INVENTION

A method of concentrating isotopes by chemical exchange at two different temperatures is disclosed in U.S. Pat. 2,797,526 patented in the name of Jerome S. Spevack on Apr. 2, 1957 and assigned to the U.S. Government. The method disclosed therein has been used to concentrate deuterium by exchange of hydrogen isotopes between hydrogen sulfide and water to obtain deuterium oxide, otherwise known as heavy water, in concentrated form. The procedure as disclosed and used comprises four basic steps as follows:

(1) Passing liquid water countercurrent to gaseous hydrogen sulfide in an exchange tower kept at a selected low temperature (the cold tower), wherein deuterium is preferentially transferred from hydrogen sulfide to water;

(2) Heating water and hydrogen sulfide to a selected higher temperature in apparatus designed for transfer of heat;

(3) Passing liquid water and gaseous hydrogen sulfide countercurrent in an exchange tower kept at said higher temperature (the hot tower) wherein deuterium is preferentially transferred from water to hydrogen sulfide;

(4) Cooling both fluids in apparatus designed for transfer of heat, returning hydrogen sulfide to the cold tower for recycling first through the cold tower then through the hot tower, countercurrent to the water, the water being partially depleted of its deuterium content and being passed to waste. By proper adjustment of the rates of flow of water and hydrogen sulfide there is caused to occur a transport of deuterium downwardly in the cold tower and upwardly in the hot tower so that deuterium becomes concentrated in both fluids, reaching a maximum in the streams flowing countercurrent between the two towers. (As noted in U.S. Pat. 2,787,526, the respective cold and hot exchange sections can, if desired, be installed in a single tower rather than as two separate towers.)

Thus the process as heretofore disclosed consists of two separate operations: (1) transfer of isotopes in exchange towers and (2) transfer of heat in apparatus designed for that purpose. Referring to an article appearing on p. 53 in Chemical Engineering Progress, vol. 58, No. 4, April 1962 by J. F. Proctor and V. R. Thayer, it is seen that the arrangement used at the Savannah River Plant for production of heavy water comprises a cold tower, a hot tower including one section for transfer of isotopes and a second section for transfer of heat, and several external vessels or heat exchangers for transfer of heat and that a somewhat different arrangement proposed by Proctor and Thayer also shows separate equipment for transfer of isotopes and transfer of heat.

Because of the scarcity of deuterium in nature, shown by the fact that natural water contains only one atom of deuterium for about 7000 atoms of "light hydrogen" (protium), large quantities of water must be processed to obtain significant quantities of heavy water. Further, the cost of building and operating equipment to carry out the process as above described is a major obstacle preventing or inhibiting the large scale use of heavy water. Heavy water is one of the best materials available to slow down or moderate neutrons in nuclear reactors but because of its high cost reactor designers often choose moderators which, although less efficient than heavy water, are less costly.

As previously noted, the currently used process, in any of its various embodiments described above, employs one set of equipment for transferring isotopes and another for transferring heat. The present invention provides a method for transferring isotopes and heat in one and the same apparatus thereby substantially reducing the cost of equipment needed to produce heavy water. Further, the new apparatus is much less costly and is much more efficient. For reasons that will become obvious from a description of the invention there will also be a substantial reduction in the cost of operating said equipment.

Accordingly, it is an object of this invention to provide methods and apparatus improved over those available in the prior art for the concentrating of isotopes.

Another object of this invention is to provide improved methods and apparatus concentrating isotopes at substantially reduced costs.

BRIEF DESCRIPTION OF THE INVENTION

In a preferred embodiment the method of this invention utilizes two fluids which are chemically different and which are physically separable from each other and which are capable of containing two isotopes of the same element. The process involves chemically exchanging at varying temperatures the desired isotope of the element with another isotope of that same element between the two fluids. In one embodiment of the invention, the two fluids may be liquid water and gaseous hydrogen sulfide. These two fluids are passed in countercurrent flow through a vessel, a transfer of isotopes occurring in said flow and heat being exchanged by direct contact between said fluids, and at the same time one or both fluids is passed through pipes or ducts placed within said vessel, thereby bringing about a transfer of heat by indirect exchange. An important feature of the invention is the provisions of pipes or ducts in the vessel in such a way that they serve two purposes: (1) providing of surface for transfer of heat between fluids by indirect exchange and (2) providing of surface for intimate mixing of fluids passing countercurrently in direct contact, whereby said ducts act as a form of tower packing effecting intimate countercurrent contact.

The advantages of this method are many and include:

(1) External heat exchangers are wholly or partly eliminated.

(2) The customary plates or conventional packings for the exchange towers are wholly or partly eliminated.

(3) External heat exchangers being eliminated, pipe lines required to carry fluids from the towers to such exchangers and then back to the towers are also eliminated.

(4) Power required to circulate one of the fluids, e.g., hydrogen sulfide, is reduced because there is less resistance in the circuit. Cost of the circulator is correspondingly reduced.

(5) Recovery of heat is more efficient because of the placing of pipes or ducts in the exchange towers as described lends itself to the use of extended surface pipes such as, for instance, those known in the trade as "finned tubes" which provide extra surface for transfer of heat without unduly adding to cost. At the same time such finned tubes provide an extended surface for intimate countercurrent contact of the fluids passing over and round them. The more efficient recovery of heat reduces the amount of heat required to operate the process, such heat being an important item of operating cost.

BRIEF DESCRIPTION OF THE DRAWINGS

The novel features that are considered characteristic of this invention are set forth with particularity in the appended claims. The invention, itself, however, both as to its apparatus and method, as well as additional objects and advantages thereof, will best be understood from the following description when read in connection with the accompanying drawings, in which:

DESCRIPTION OF THE PREFERRED EMBODIMENT

Figure 1:
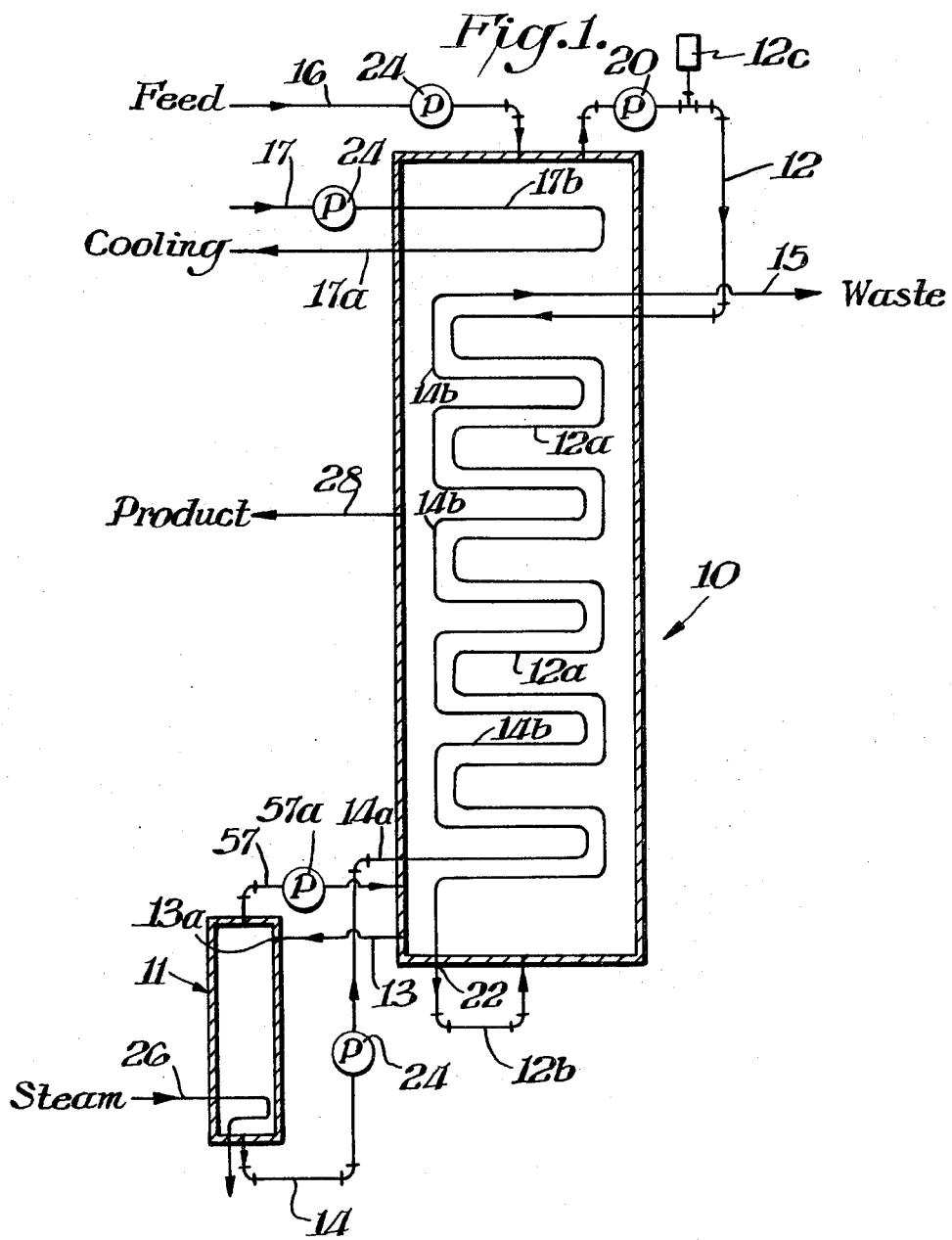
FIG. 1 is a schematic flow diagram of an apparatus constructed in accordance with this invention suitable for use in carrying out the method of this invention in this instance exchanging isotopes between two fluids both of which are liquids.

The essential element in a countercurrent process for the concentration of an isotope of an element is a contacting tower or exchange tower in which two different fluids are able to pass in different senses, i.e., countercurrently with respect to each other, while in intimate physical contact to permit the direct exchange of atoms or ions between the two fluids. In this description the term "fluid" is used to denote liquids as well as gasses each being considered a fluid. If the two fluids are physically separable from each other and are both capable of containing both of the isotopes of the element involved and the fluids are selected such that their chemical exchange equations have different equilibrium constants at different temperatures, then the basis for the temperature variant chemical exchange concentration process exists. This process involving different elements and different fluids has been described in many places in the literature (see for example the article appearing on p. 70 of Chemical Engineering Progress entitled "Production of Heavy Water" by Bebbington and Thayer, vol. 55, No. 9, September 1959). In the well known case of isotope concentration using water and hydrogen sulfide, the chemical exchange reaction is expressed by the equation $H_2O+HDS=HDO+H_2S$. The equilibrium constant of this chemical reaction which takes place in the liquid phase between the water and hydrogen sulfide dissolved therein is expressed by the equation $$K_x = \frac{HDO_1 \cdot H_2S_1}{H_2O_1 \cdot HDS_1}$$

where $HDO_1$ and $H_2O_1$ are the mol fractions of these components in the liquid phase and $H_2S_1$ and $HDS_1$ are mol fractions dissolved in the liquid phase. Since this equilibrium constant varies with temperature, the basis for the separation of the deuterium from normal hydrogen or protium exists. Because of the differences in this equilibrium constant the concentration of HDO at lower temperatures is greater than at the higher temperatures. Hence, by bubbling the hydrogen sulfide gas up through the tower countercurrent with the feed water which is trickling down through the tower and two such towers are created as in the prior art, one being maintained at a high temperature and the other being maintained at a cold temperature, there is a net transfer of the deuterium isotopes from the hydrogen sulfide gas to the feed water in the cold tower and conversely, from the feed water to the hydrogen sulfide gas in the hot tower. If now some of the material between the towers is withdrawn, the withdrawn portion, whether it be liquid or gas, will have a higher concentration of deuterium than normal.

As noted this chemical exchange process may be used to concentrate the isotopes of a variety of elements. A partial listing of typical elements which may be concentrated using this exchange process are set forth in the said Spevack patent. Deuterium may be concentrated by the exchange between some twenty-four different substances including hydrogen and water, water and hydrochloric acid, sulfuric acid and hydrochloric acid. In addition, sulphur of one atomic weight may be concentrated. The isotopes of oxygen may be concentrated as may the isotopes of chlorine, carbon, and nitrogen. Deuterium may be concentrated also by using water and any compound which contains a —SH group and is physically separable from water. An example of such process involves the use of water and ethyl mercaptan, both being liquids under the conditions used for effecting the exchange of isotopes. A system utilizing this process is illustrated in the drawing of FIG. 1 by way of example.

In one embodiment of this invention, the functions of the hot and cold towers are carried out in a single vessel or exchange tower 10. This may be a closed vessel having various inlets and outlets to permit the ingress and egress of the feed water and the ethyl mercaptan. Thus, feed water from an adequate source of cold water is passed through an inlet pipe or conduit 16 to discharge into the top of the exchange tower 10. At the same time, ethyl mercaptan passing through a suitable fluid conduit 12 discharges into the bottom of the exchange tower 10. Water being the heavier liquid sinks downward through the exchange tower in countercurrent flow to the ethyl mercaptan which rises. The mercaptan is withdrawn from the top of the exchange tower which is open at the top for exit of said mercaptan through the conduit 12. A suitable pump 20 passes the mercaptan down through the conduits 12, 12a and 12b using the outlet at the bottom of the tower. Conduit 12a, which comprises the mercaptan circuit back down through the interior of the exchange tower 10, is arranged in a circuitous or coiled manner. The mercaptan exits at the bottom of the column, being denoted as 22 and passes through conduit 12b which leads the mercaptan to be discharged again into the bottom of the exchange tower. Cooling water from a suitable source which may be the same as that of the feed water is passed through a conduit 17 located in the upper portion of the tower 10 and back out again at 17a to provide cooling of the mixture of feed water and mercaptan passing through the tower and around conduit 17b within the tower.

A stripping column or stripper 11 of conventional design is used to receive the feed water which exits at an outlet 13 located at the bottom of the tower 10. Steam is passed through a heating coil 26 located in the lower portion of the stripper 11 while the feed water, passing through the conduit 13 and into stripper 11 at 13a, passes downwardly through the stripper and out through the conduit 14 and pump 24. From the pump 24, the water passes through conduit 14a which continues along a circuitous path upwardly through the tower 10 as coils 14b and then out near the top to outlet 15 where water is discharged to waste. At the same time, gaseous mercaptan and water vapor pass upwardly in stripper 11 and through the conduit 57 to be reintroduced in the lower portion of the tower 10 where they condense to liquids thereby giving up heat. Mercaptan thus recovered joins mercaptan being introduced at the bottom of the tower through the conduit 12b. To complete the tower, an outlet conduit 28 is provided at the center portion of the tower 10 through which the respective fluids, enriched in the isotope deuterium, may be withdrawn. Further in accordance with this invention the conduits 12, 12a and 12b which form the mercaptan circuit, the process water circuit (14, 14a and 14b) and the cooling water circuit (17, 17a and 17b) are arranged so that the sections within the tower 10 provide an extended surface area for the transfer of heat. To achieve the maximum heat transfer these sections may be provided with fins or they may be simply increased in number or quantity by putting in enough coils or straight tubes to effect the heat transfer required and in addition, to provide enough surface area within the tower area to promote intimate contact between the fluids which are passing countercurrently within the tower. The particular conduits within the tower may be any suitable design needed to perform the heat exchange as well as the contacting function.

In the operation of the system illustrated in FIG. 1, water and mercaptan pass countercurrently over and around the conduits 12a, 14b and 17b. This affords intimate contact between the heavier and settling water and the lighter and rising mercaptan, thereby promoting the transfer of deuterium, and providing also a means for efficient heat exchange between said settling water and rising mercaptan. Upon reaching the bottom of the tower 10, water enters the conduit 13 and passes to the stripping column 11 wherein the dissolved mercaptan is removed and returned to the tower 10 through the conduit 57. Heat is added to the base of the stripping column 11 by means of a steam coil or other suitable means. Water passes from the base of the stripping column 11 through the conduit 14 with the aid of the pump 24 then through conduit 14a upwardly through circuitous sections 14b through the tower 10. This water as it passes upward through the tower 10 gives up heat by indirect exchange with the fluids passing over and around sections 14b and it then passes to waste through the conduit 15 which passes out of the tower near the top just below the cooling coils denoted by the conduit 17b. Feed water from the conduit 16 flowing through the tower thus acquires heat by indirect exchange with the water flowing upward through sections 14b and also acquires heat by direct exchange with the mercaptan rising upward through the tower. As the water passes downwardly it picks up more and more heat. At the same time, the mercaptan flowing downwardly through the sections 12a within the tower acquires heat by indirect exchange with both the water and the mercaptan which flow countercurrently over and round sections 12a and 14b. Thus, it gains heat as it approaches the inlet end of the conduit 12 at the bottom of tower 10. While all this is happening, there occurs an exchange of isotopes between the water and mercaptan flowing countercurrent within the tower 10. The mercaptan remains within the apparatus except for inadvertent losses, which are made up by introducing additional mercaptan from source 12c.

It is recognized that heat recovery by exchange mechanism described is never complete, and, hence, some heating and cooling must be supplied externally to make up the heat loss. This heat loss is supplied through the stripping column 11 by the steam passing through the heating coil 26. In like manner, cooling inefficiencies are made up through the cooling water circuit comprising section 17b located at the top portion of the exchange tower. By proper adjustment of the rates of flow of the mercaptan and water under the control of the several pumps there is caused a net transport of deuterium downwardly in the cooler upper portion of the exchange tower 10 and a net transport upwardly in the warmer lower portion of the tower. Thus, deuterium becomes concentrated in the central portion of the tower 10 so that water and mercaptan passing countercurrently through this central portion are both enriched in deuterium and portions of these enriched fluids can be withdrawn from the central portion for further processing or for use as such. Such withdrawal takes place through the outlet conduit 28. A mixture containing both fluids is withdrawn, said mixture is then separated in a conventional settling apparatus, not shown, from which one or the other of the fluids may, if desired, be returned to tower 10 at a point near the junction of conduit 28.

Although an important feature of this invention is that isotopes are caused to exchange by passage of the fluids over and around the conduits within the tower 10 and heat is at the same time caused to exchange by passage of the fluids both through and around and over the same conduits, it is considered to be within the scope of this invention that additional exchange of isotopes can be achieved by adding conventional tower plates or packing or both to the exchange tower. Alternatively, the plates, packing and conduits may be integrated in any convenient manner so as to achieve the objectives of this invention. The process of this invention differs considerably from prior art processes available for the extraction of isotopes in that these previous processes utilize isotopic exchange at two selected and controlled temperatures whereas the present process contemplates a temperature that varies more or less continuously from the cold higher end of the tower 10 to the hot lower end of the tower 10. The previous processes on the other hand embody two separate towers or sections, one cold section held at a selected low temperature and the hot section held at a selected high temperature.

I have found that isotopic concentration proceeds effectively when one extreme of temperature is maintained at the inlet where the feed fluid first contacts the circulating fluid and the opposite extreme of temperature is maintained at the outlet where the feed fluid last contacts is circulating fluid. In the present example a low temperature is maintained at the top of exchange tower 10 and a high temperature at the bottom of said tower from which point the feed water, by now partially depleted in deuterium, leaves the tower. As said feed water passes downwardly from the top of tower 10, it continually becomes warmer and at the same time its deuterium content continually becomes greater, said deuterium content reaching a maximum at an intermediate point in the tower at which point the temperature also is intermediate. As said feed water continues downwardly below said intermediate point, its temperature continues to rise but its deuterium content now starts to fall reaching a minimum at the bottom of the tower from which point said water goes to stripper 11 and eventually to waste. (At the same time, of course, mercaptan is flowing upwardly in tower 10, the flows of both fluids being closely controlled at suitable rates.) The above stated finding regarding the process of isotopic exchange at different temperatures permits carrying out the isotopic exchange and the heat exchange simultaneously in the same apparatus, in this example the tower 10, by placing suitable conduits therein as previously described, thus drastically reducing the cost of apparatus required to implement the process.

For the most part, the tower 10 does not require plates or packing of the conventional nature in as much as sections 17b, 12a and 14b themselves are designed sufficiently circuitously, are designed with fins, etc. to permit the large surface area necessary to permit intimate contact with and between the surrounding fluids. By the fact that no external heat exchangers (except the stripper as noted) are used, the process piping is drastically reduced. Recovery of heat is utilized to the fullest extent by piping the several fluids back through the tower wherever possible to utilize to a maximum any heat or cooling that is available. For instance, the stream condensate from the stripper can, if desired, be passed through tower 10 inside a coil paralleling coil 14b.

Figure 2:
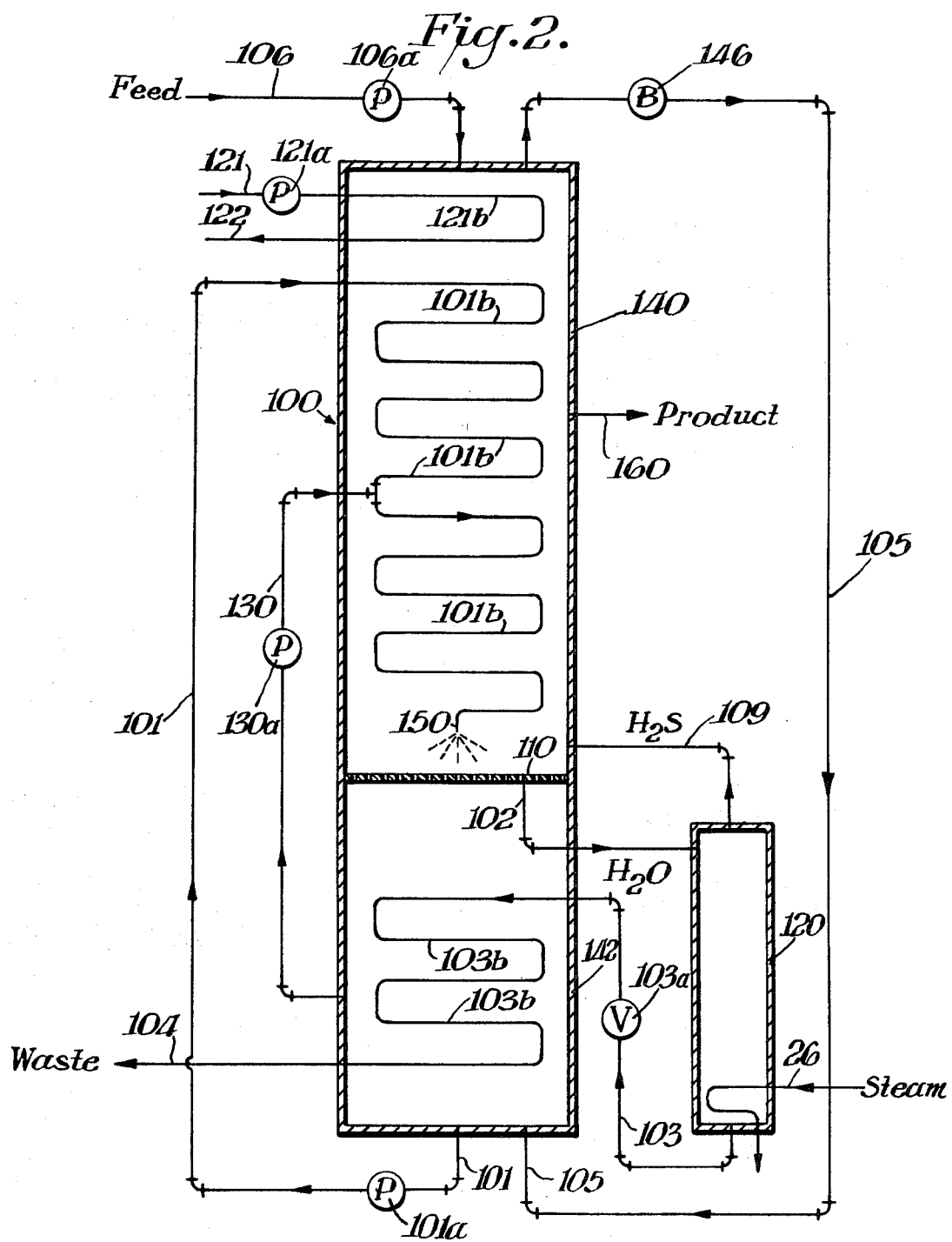
FIG. 2 is a schematic flow diagram of an alternative apparatus suitable for use in carrying out an alternative method of this invention in this instance exchanging isotopes between two fluids, one being a liquid and the second a gas.

The drawing of FIG. 2 illustrates another apparatus and process in accordance with this invention designed to concentrate deuterium in a system employing liquid water and gaseous hydrogen sulfide. The apparatus required to implement the process illustrated in FIG. 2 includes a vessel or exchange tower 100, the lower portion of which is generally separated from the upper portion by a suitable plate or tray 110 to permit the collection of water as will be described. The tower may be considered as being composed of two portions—the upper portion 140 and a lower portion 142. The upper portion 140 functions essentially as a dehumidifier vessel and the lower portion 142 essentially as a humidifier vessel. Also making up the system is a stripping column or stripper 120 and a plurality of pumps as may be necessary to promote circulation fo the fluids as required. A centrifugal blower 146 positioned so as to receive gas from the top of the apparatus may be used to circulate the hydrogen sulfide gas. The apparatus will be described as if the vessel 100 is a single exchange tower separated by the plate 110 into the upper or dehumidifier portion 140 and the lower or humidifier portion 142.

The feed water of a suitable temperature is supplied through a suitable conduit 106 and discharged into the upper portion of the exchange tower 100 which contains hydrogen sulfide gas under suitable pressure aided by a pump 106a. The feed water thus discharged into the top of the tower 100 passes downwardly through the dehumidifier portion 140 to the collector plate or tray 110 and thence on downwardly through the humidifier portion 142 of the tower 100 from which it is fed out through the conduit 101 by the aid of a pump 101a to the upper portion of the dehumidifier portion 140 for heat exchange purposes. At this point the conduit sections 101b follow a circuitous path thus providing adequate surface for countercurrent contacting of fluids within the tower and adequate opportunity for indirect heat exchange to occur. At the end of the circuitous sections (which may be of the type described in conjunction with the embodiment of FIG. 1) the water is introduced as by the spray nozzle 150 onto the tray 110. Alternatively, if desired, the water flowing in conduit 101b can be further heated by extending said conduit outside of tower 140, connecting to an external heat exchanger heated by steam or other suitable means, then returning said water to said tower for discharge onto tray 110. A portion of the water is permitted to pass downwardly into the humidifier portion 142, and a portion is collected from the tray 110 through the conduit 102 and passed to the upper portion of the stripper 120. Steam is introduced to the stripper through the coil 26 where it serves to vaporize water which vapor then passes upwardly through the stripper 120 and out with the resulting stripped hydrogen sulfide gas through the conduit 109 into the lower portion of the dehumidifier section 140 of the tower 100. The stripped water is permitted to pass out of the bottom of the stripper 120 through the conduit 103 and reducing valve 103a through a circuitous conduit 103b located in the lower or humidifier portion 142 of the exchange tower and thence out through a waste conduit 104 to waste. Here again, the circuitous conduit 103b may be finned or of sufficient coils or straight tubes to provide an adequate surface both for the heat exchange and the packing function previously described.

Cooling water is passed into the upper portion of the tower 100 through a conduit 121 with the aid of the pump 121a into coils 121b where it acts to remove heat from the downflowing feed water which is absorbing heat from the upflowing hydrogen sulfide gas both of which are flowing within the tower. The cooling water flows outwardly through the conduit 122. This cooling water makes up for the inability of the heat exchange taking place within the tower to be one hundred percent efficient. A conduit 130 with the aid of a pump 130a permits the withdrawal of some of the water passing downwardly through the tower from the humidifier portion 142. Such water is passed upwardly and added to the mid-portion of the circuitous section 101b being added to the water therein flowing to spray 150. Gas is withdrawn from the top portion of tower 100 and is passed with the aid of the centrifugal blower 146 and conduit 105 to the bottom of the tower 100 where it is again introduced and permitted to pass upwardly through the tower 100. Enriched material may be withdrawn from either the upwardly flowing hydrogen sulfide or from the downwardly traveling feed water or from both at an outlet conduit or conduits 160 suitably connected to the central portion of the dehumidifier section 140, for passage to a subsequent enrichment tower or for use as desired. It is, of course, appreciated that the circulating phase, hydrogen sulfide in this case, is going into and out of solution with water and that the exchange of isotopes involves ionic exchanges.

The operation of the process shown in FIG. 2 contempates passing a portion of the water from the tray 110 through the conduit 102 into the stripper 120 where the dissolved hydrogen sulfide is removed. The removed hydrogen sulfide mixed with water vapor is then returned to the bottom of the dehumidifier section 140 through the conduit 109. That portion of the water which is not withdrawn by the conduit 102 passes downwardly from the tray 110 into the humidifier section 142 of the tower 100 and it flows downwardly over and around the circuitous conduit 103b. At the same time, heated water passes from the bottom of the stripper column 120 to the conduit 103, thence downwardly within and through the circuitous sections 103b in the humidifier section 142, thence to waste through the conduit 104. While passing through the humidifier section 142 in the conduits 103b the water gives up heat to the water flowing downwardly and around the outside of the sections 103b. At the same time, said downwardly flowing water gives heat to the hydrogen sulfide gas passing upwardly around the outside of the same conduits 103b which provide the surface area or packing effect within the humidifier section 142. The combined action thus heats and humidifies the upwardly flowing hydrogen sulfide.

The hydrogen sulfide gas thus heated and humidified in the humidifier section 142, passes upwardly through the collection plate 110 into the dehumidifier section 140 of the exchange tower 100. In the dehumidifier section 140, the rising hydrogen sulfide flows upwardly around the outside of the conduits 101b countercurrently to the feed water which is passing downwardly and around the same conduits 101b. During such passage, the hydrogen sulfide is in intimate contact with the water and passes into and out of solution. While dissolved in water, the hydrogen sulfide exchanges isotopes with the downwardly traveling feed water and at the same time the intimate contact brings about an exchange of heat between said hydrogen sulfide gas and said feed water. The feed water in turn gives up heat by indirect exchange with the water flowing downwardly through the conduits 101b thereby heating said last named water for use in the humidifier section 142. The water from sections 101b is then discharged as by sprayer 150 or other suitable means into the bottom of the dehumidifier section 140 onto the tray 110 where it mixes with the now heated feed water that is passing downwardly through the same section 140 but on the outside of the conduits 101b.

During their countercurrent passage around conduit 121b and around the upper portion of conduit 101b, hydrogen sulfide and water exchange isotopes at relatively low temperatures, the lowest being that at the top of conduit 121b. At such relatively low temperatures and at the selected and controlled flow rates of the upwardly flowing hydrogen sulfide gas and the downwardly flowing feed water there occurs a transfer of deuterium from the hydrogen sulfide to the water thereby progressively enriching the water as it flows downwardly in the tower. On the other hand, as said hydrogen sulfide gas and water pass countercurrently around the lower part of conduit 101b, the higher temperatures there prevailing, the highest being at or just above the collector plate 110, cause a transfer of deuterium from water to hydrogen sulfide thereby progressively depleting the deuterium content of the water as it flows downwardly in said section of the tower. Thus the zone of maximum concentration of deuterium occurs at a location above the midpoint of conduit 101b from which location water enriched in deuterium can be withdrawn as a product through conduit 160, said conduit being suitably connected to the tower so as to draw water. Alternatively, a portion of the upwardly rising hydrogen sulfide, which at this point is enriched in deuterium, can be withdrawn in which case conduit 160 is connected so as to draw gas. Again, alternatively, both fluids can be withdrawn through suitable conduits, if desired, although it is usually preferable to withdrawn either one or the other rather than both.

The gradient of deuterium concentration existing within dehumidifier section 140 varies according to the ratio of the respective flows of feed water and hydrogen sulfide gas passing countercurrently within said section 140, which ratio can be adjusted during operation to insure that the zone of maximum concentration is at the conduit or conduits used for product take-off.

The minimum concentration of deuterium occurs on collector tray 110 from which water, depleted in deuterium below the level at which it entered column 100 as feed, passes to stripper 120 and thence via conduit 103b to waste. Because of the high rate of recirculation of water through conduits 101b discharging onto tray 110 and passing thence downwardly through the humidifier section 142, no significant change in deuterium concentration occurs in the humidifier section 142, the function of said section 142 being merely to heat and humidify the hydrogen sulfide gas passing upwardly therein.

The novel and advantageous features of the present invention will be apparent when comparing the process and apparatus shown schematically in FIG. 2 with that shown, for instance, in FIG. 4 of the article by Proctor and Thayer (Chemical Engineering Progress, vol. 56, No. 4, p. 60) previously cited. The schematic of said FIG. 4 shows towers made up of several sections, specifically a cold isotope exchange section, a gas cooling section (dehumidifier), a hot isotope exchange section, a gas heating section (humidifier) and shows also several heat exchangers, specifically a "cooling water exchanger," a "heat recovery exchanger" and a "stripper exchanger." (It should be noted that each of said external heat exchangers shown schematically in FIG. 4 represents a heat exchange function that in practice would involve several conventional shell-and-tube exchangers.) Considering now FIG. 2, it is apparent that tower 100 serves in lieu of all the several above mentioned separate items shown in FIG. 4 of the cited article. That is, the dehumidifier section 140 of the tower 100 replaces not only the dehumidifier of FIG. 4 but also the cold isotope exchange section, the hot isotope exchange section, the "cooling water exchanger" and the "heat recovery exchanger" shown on said FIG. 4; and the humidifier section 140 of tower 100 replaces not only the humidifier of FIG. 4 but also the "stripper exchanger" as shown on said FIG. 4. As previously noted, such combining of functions as accomplished by the present invention eliminates from apparatus used in the prior art the following items: (1) part or all of the conventional trays or packing for the isotope exchange sections, (2) essentially all of the external heat exchangers, (3) the pipe lines required to connect said external heat exchangers to the several tower sections, and (4) that section of the tower including plates or packing, utilized in the prior art for dehumidification of the hydrogen sulfide gas. Because of the reduced length of the tower and the relatively low resistance encountered by the hydrogen sulfide gas flowing over and around the conduits 103b, 101b and 121b the power required to circulate said hydrogen sulfide gas is substantially reduced. Also, because the heat exchange surface provided by said conduits is relatively inexpensive compared to equivalent surfaces in conventional heat exchangers, sufficient surface can be provided in said conduits to substantially improve heat recovery with unduly adding to capital cost. The operating cost of the process according to the present invention is thus reduced because the requirements for both heat and power are reduced as above described.

Condits such as the said conduits 101b and 121b are a particularly important feature of the present invention because their use as above described permits the hydrogen sulfide gas to be cooled (dehumidified) at the same time said gas is passing in direct countercurrent contact with a stream of feed water the rate of flow of which feed water has been selected and controlled to bring about a concentration of deuterium. On the other hand, when using the dehumidification scheme shown in the cited article written by Proctor and Thayer, the hydrogen sulfide gas is cooled by direct contact with a much larger flow of water, part of which is water taken from the bottom of the dehumidifier section, cooled by passage through external heat exchangers then introduced into the top of the dehumidifier section where it mixes with the feed water flowing downwardly therein. Because of this recirculation of water, no significant concentration of deuterium can occur in the dehumidifier section so arranged and operated. Hence, according to the prior art shown in the cited paper, all of the achievable concentration of deuterium in the downwardly flowing water occurs in the cold exchange section above the dehumidifier section. According to the present invention, however, the feed water which is flowing downwardly at a rate such as to bring about the desired concentration of deuterium is continuously cooled by indirect exchange of heat with water flowing inside conduits 121b and 101b, being thereby enabled to accomplish the desired cooling (dehumidification) of the upwardly flowing hydrogen sulfide gas. Thus, whereas according to the prior art three steps of the process, viz, deuterium concentration, dehumidification, and recovery of heat from said dehumidification are carried out successively in three different parts of the apparatus, according to the present invention said three steps are carried out concurrently in one and the same part of the apparatus. In said part, designated as the dehumidifier section 142 of tower 100, conduits 121b and 101b constitute surface that serves a triple function (1) indirect exchange of heat between water flowing over and around the outside of said conduits and water flowing inside said conduits, (2) heat exchange by direct contact between water and hydrogen sulfide gas flowing countercurrently over and around the outside of said conduits and (3) deuterium concentration by countercurrent exchange of isotopes between said water and said hydrogen sulfide, all of said three functions being achieved concurrently as hereinbefore described.

Also, it is a part of the present invention to combine functions in the humidifier section 142 of tower 100 wherein conduit 103b constitutes surface that serves a double function—(1) heat exchange by direct contact between water flowing downwardly and hydrogen sulfide gas flowing upwardly over and around the outside of said conduit and (2) indirect heat exchange between said downwardly flowing water and water passing inside said conduit.

In summary, the hydrogen sulfide passes upwardly through the tower 100 exchanging both heat and isotopes by direct contact with the water flowing downwardly. This downwardly flowing water at the same time exchanges heat by indirect contact with the water passing inside conduits 101b. These two water streams are both mixed at elements 110–150 in the lower portion of the dehumidifier section 140. Part of this water mixture then passes to the stripper 120 where it is stripped of dissolved hydrogen sulfide and at the same time heated to a temperature higher than that at which it left the dehumidifier section of the tower 100. This now heated water (stripped of hydrogen sulfide) enters the conduits 103b of the humidifier section 142 where it gives up heat to the downwardly flowing water (which in turn gives off heat to the upwardly flowing hydrogen sulfide gas from 105) and is then passed to waste.

Thus, heat is given to the hydrogen sulfide gas in the humidifier 142 and recovered from the gas in the dehumidifier section 140. This transfer of heat is accomplished by direct exchange between gas and water and indirect exchange between water and water. Such recovery of heat can never be complete, and some heating and cooling of the system by external means is required. In this case, heat is supplied to the stripping column 120 by steam coil 26 or other suitable heating mechanism. In like manner, cooling is provided by means of the cooling water pipes 121b located in the top section of the tower 100.

By proper adjustment of the rates of flow of feed water and hydrogen sulfide in the tower 100 there is caused to occur a net transfer of deuterium upwardly in the warmer lower part of the dehumidifier section between collector plate 110 and product conduit 160 and a net transfer of deuterium downwardly in the cooler upper part of the dehumidifier above product conduit 160. Deuterium thus concentrates both in the water and in the hydrogen sulfide gas reaching a maximum in both streams as they pass countercurrently through the center portion of the dehumidifier section 140. Hence, portions of either or both fluids can be withdrawn through suitable conduits for further processing or for use as such.

As a means of further facilitating the recovery of heat from the hydrogen sulfide gas a secondary water circuit involving the conduit 130 conducts water from the central portion of the humidifier section 142 into the conduit 101b in the dehumidifier section 140. This is at or near the central portion of the dehumidifier section 140 (preferably below the point at which the product is withdrawn). This injected water mixes with water already flowing in conduit 101b, the mixture thereafter passing downwardly through the conduit 101b and through the sprayer 150 where it joins the water that has flowed over the sections 101b, as previously noted. In some cases it may be desirable to provide several such secondary circuits between the humidifier and the dehumidifier sections. These additional circuits may be added as desired according to the design requirements.

Although no particular operating pressures and temperatures have been given, the operation of processes involving isotope exchange is well known and conventional temperatures and pressures may be used as necessary to obtain the desired isotope exchange. In a typical case, the feed water entering the top of the tower 100 may be in the vicinity of 30 to 35° C. whereas the hottest portion of tower 100, said hottest portion being at or just above the collector plate 110, may be at 125–135° C. Gas pressure of the hydrogen sulfide gas may be in the neighborhood of 275 pounds per square inch. In the case of hydrogen sulfide the upper limit of pressure at which it can be operated is typically in the neighborhood of 325 pounds per square inch absolute to prevent complete liquification of the hydrogen sulfide.

As used herein the term "vessel" denotes a flow system wherein the exchange process occurs. Depending upon the particular application, the apparatus may comprise a single vessel or alternatively, two or more vessels arranged so that they in effect function as a single vessel, the choice being simply a matter of structural economy and/or convenience.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. A method of concentrating an isotope of an element by isotopic exchange between circulating and feed fluids taken from the group consisting of hydrogen sulfide and water and ethyl mercaptan and water utilizing an exchange vessel having at least one conduit located therein and having a hot zone and a cold zone, said conduit traversing at least a portion of said hot zone, said method comprising the steps of:
   passing said feed fluid containing said isotope through said vessel and over the exterior of said conduit,
   passing said circulating fluid countercurrently to said feed fluid through said vessel and over the exterior of said conduit, thereby effecting a transfer of said isotopes and heat by direct exchange between said circulating and said feed fluids,
   simultaneously therewith passing at least one of said fluids as it is modified after passage through said vessel through said conduit, thereby efflecting a further transfer of heat between said fluids, and
   withdrawing one of said circulating and said feed fluids from selected points in said vessel, said withdrawn fluid containing concentrated therein said isotope.

2. A method according to claim 1 which includes the step of maintaining a portion of one of said fluids in a gaseous phase and maintaining a portion of the other or said fluids in a liquid phase.

3. A method according to claim 1 which includes the step of passing the other one of said fluids as it is modified after passage through said vessel through a second conduit in said vessel also serially traversing both of said zones to effect heat exchange with said feed and circulating fluids passing over and around said second conduit by indirect exchange.

4. A method in accordance with claim 1 wherein one of said fluids is liquid water and the other is gaseous hydrogen sulfide and the isotope being concentrated is deuterium.

5. A method in accordance with claim 4 wherein said water and hydrogen sulfide gas pass countercurrently in direct contact through one section of said vessel, and passing said water through one of said conduits thereby to heat said water in said one conduit, and subsequently using said last-named water to heat and humidify said hydrogen sulfide gas by direct contact therewith in another section of said vessel.

6. A method in accordance with claim 4 which also includes withdrawing water from said vessel and stripping it of hydrogen sulfide, and subsequently passing said stripped water through a conduit located in a section of said vessel wherein hydrogen sulfide gas is being heated and humidified by direct countercurrent contact with water passing over and around said last-named conduit.

7. Apparatus for producing a concentrate of an isotope of an element by isotopic exchange between circulating and feed fluids taken from the group consisting of hydrogen sulfide and water and ethyl mercaptan and water which apparatus comprises:
   a vessel having a hot zone and a cold zone for containing said fluids and transporting them through said vessel,
   ingress and egress means for each of said fluids affording countercurrent flow of said fluids through said vessel,
   at least one conduit within said vessel traversing at least a portion of said hot zone and which has heat conducting walls and is connected to one of said fluid egress means to receive and pass one of said fluids through the conduit, thereby affording a means for transferring heat by indirect exchange between its outer walls and the fluid flowing thereover and said conduit also affording a mixing means for said fluids flowing thereover thereby enhancing the exchange of heat and isotopes between said fluids.

8. Apparatus in accordance with claim 7 which includes at least one other conduit positioned within said vessel, also traversing both of said zones, and adapted to receive the other one of said fluids from the other one of said fluid egress means for passage back through said vessel within said other conduit, thereby transferring heat by conduction to and from said fluids flowing thereover and enhancing the exchange of heat and isotopes between said fluids.

9. Apparatus in accordance with claim 7 which includes:
means for withdrawing one of said fluids from said vessel,
means for heating said one fluid, and
another conduit positioned within said vessel traversing both of said zones and adapted to receive said heated fluid, thereby to effect indirect heat transfer between said one fluid and said fluids.

References Cited
UNITED STATES PATENTS 2,787,526   4/1957   Spevack _____ 23—204 R OSCAR R. VERTIZ, Primary Examiner H. S. MILLER, Assistant Examiner U.S. Cl. X.R.

260—609 A; 423—270.5, 270 R, 563